United States Patent
Schonewille

(10) Patent No.: US 7,751,277 B2
(45) Date of Patent: Jul. 6, 2010

(54) METHOD FOR INTERPOLATING SEISMIC DATA BY ANTI-ALIAS, ANTI-LEAKAGE FOURIER TRANSFORM

(75) Inventor: Michel Albert Schonewille, Walton-on Thames (GB)

(73) Assignee: PGS Geophysical AS, Lysaker (NO)

( * ) Notice: Subject to any disclaimer, the term of this patent is extended or adjusted under 35 U.S.C. 154(b) by 341 days.

(21) Appl. No.: 12/077,108

(22) Filed: Mar. 17, 2008

(65) Prior Publication Data

US 2009/0231956 A1 Sep. 17, 2009

(51) Int. Cl.
*G01V 1/28* (2006.01)
(52) U.S. Cl. .............................. 367/38; 367/63; 702/14
(58) Field of Classification Search .................. 367/38, 367/49, 63; 702/14, 17
See application file for complete search history.

(56) References Cited

U.S. PATENT DOCUMENTS

| | | | |
|---|---|---|---|
| 4,594,693 A * | 6/1986 | Pann et al. ..................... 367/43 |
| 4,628,492 A | 12/1986 | Winney | |
| 4,922,465 A | 5/1990 | Pieprzak et al. | |
| 5,235,556 A | 8/1993 | Monk et al. | |
| 5,617,372 A * | 4/1997 | Gulunay et al. ............... 367/38 |
| 5,648,938 A | 7/1997 | Jakubowicz | |
| 5,677,892 A * | 10/1997 | Gulunay et al. ............... 367/38 |
| 7,027,929 B2 * | 4/2006 | Wang ........................... 702/17 |
| 7,239,578 B2 | 7/2007 | Robinson | |
| 2002/0051003 A1 | 5/2002 | Cosman et al. | |

FOREIGN PATENT DOCUMENTS

| | | |
|---|---|---|
| EP | 0551210 | 7/1993 |

OTHER PUBLICATIONS

S. Spitz, 1991, "Seismic trace intrpolation in the F-X domain", Geophysics, SEG, vol. 56, No. 6, June, 785-794.

N. Gulunay and R.E. Chambers, 1996, "Unaliased f-k domain trace interpolation (UFKI)", 66th Ann. Intl. Mtg., SEG, Exp. Abst., vol. 15, 1461-1464.

Sheng Xu et al., 2004, "On the orthogonality of anti-leakage Fourier transform based seismic trace interpolation", 74th Ann. Intl. Mtg., SEG, Exp. Abst., vol. 23, 2013-2016.

Sheng Xu et al., 2005, "Antileakage Fourier transform for seismic data regularization", Geophysics, SEG, vol. 70, No. 4, July-August, V87-V89.

R. Abma and N. Kabir, 2006, "3D interpolation of irregular data with a POSC algorthm", Geophysics, SEG, vol. 71, No. 6, November-December, E91-E97.

(Continued)

*Primary Examiner*—Ian J Lobo
(74) *Attorney, Agent, or Firm*—E. Eugene Thigpen; Charles R. Schweppe

(57) ABSTRACT

An estimated frequency-wavenumber spectrum is generated by applying a first Anti-leakage Fourier transform method to unaliased frequency components in temporal-transformed seismic data and applying a second Anti-leakage Fourier transform method to aliased frequency components in the temporal-transformed seismic data. The second Anti-leakage Fourier transform method applies an absolute frequency-wavenumber spectrum extrapolated from unaliased frequencies to aliased frequencies to weight frequency-wavenumber components of the aliased frequencies. An inverse temporal and spatial Fourier transform is applied to the estimated frequency-wavenumber spectrum, generating trace interpolation of the seismic data.

22 Claims, 12 Drawing Sheets

- Generate estimated frequency-wavenumber spectrum by applying first Anti-leakage Fourier transform method to unaliased frequency components of temporal-transformed seismic data and applying second Anti-leakage Fourier transform method to aliased frequency components of temporal-transformed seismic data, where second Anti-leakage Fourier transform method applies absolute frequency-wavenumber spectrum extrapolated from unaliased frequencies to aliased frequencies to weight frequncy-wavenumber components of aliased frequencies — 11

- Apply inverse spatial and temporal Fourier transform to estimated frequency-wavenumber spectrum, generating trace interpolation of input seismic data — 12

OTHER PUBLICATIONS

P.M. Zwartjes and M.D. Sacchi, 2007, "Fourier reconstruction of nonuniformly sampled, aliased seismic data", Geophysics, SEG, vol. 72, No. 1, January-February, V21-V32.

Robert Soubaras, 1997, Spatial interpolation of aliased seismic dat Exp. Abst., vol. 16, 1167-1170.

European Patent Office, Search Report, Jun. 14, 2009.

* cited by examiner

Generate estimated frequency-wavenumber spectrum by applying first Anti-leakage Fourier transform method to unaliased frequency components of temporal-transformed seismic data and applying second Anti-leakage Fourier transform method to aliased frequency components of temporal-transformed seismic data, where second Anti-leakage Fourier transform method applies absolute frequency-wavenumber spectrum extrapolated from unaliased frequencies to aliased frequencies to weight frequncy-wavenumber components of aliased frequencies ⟶ 11

Apply inverse spatial and temporal Fourier transform to estimated frequency-wavenumber spectrum, generating trace interpolation of input seismic data ⟶ 12

*FIG. 1*

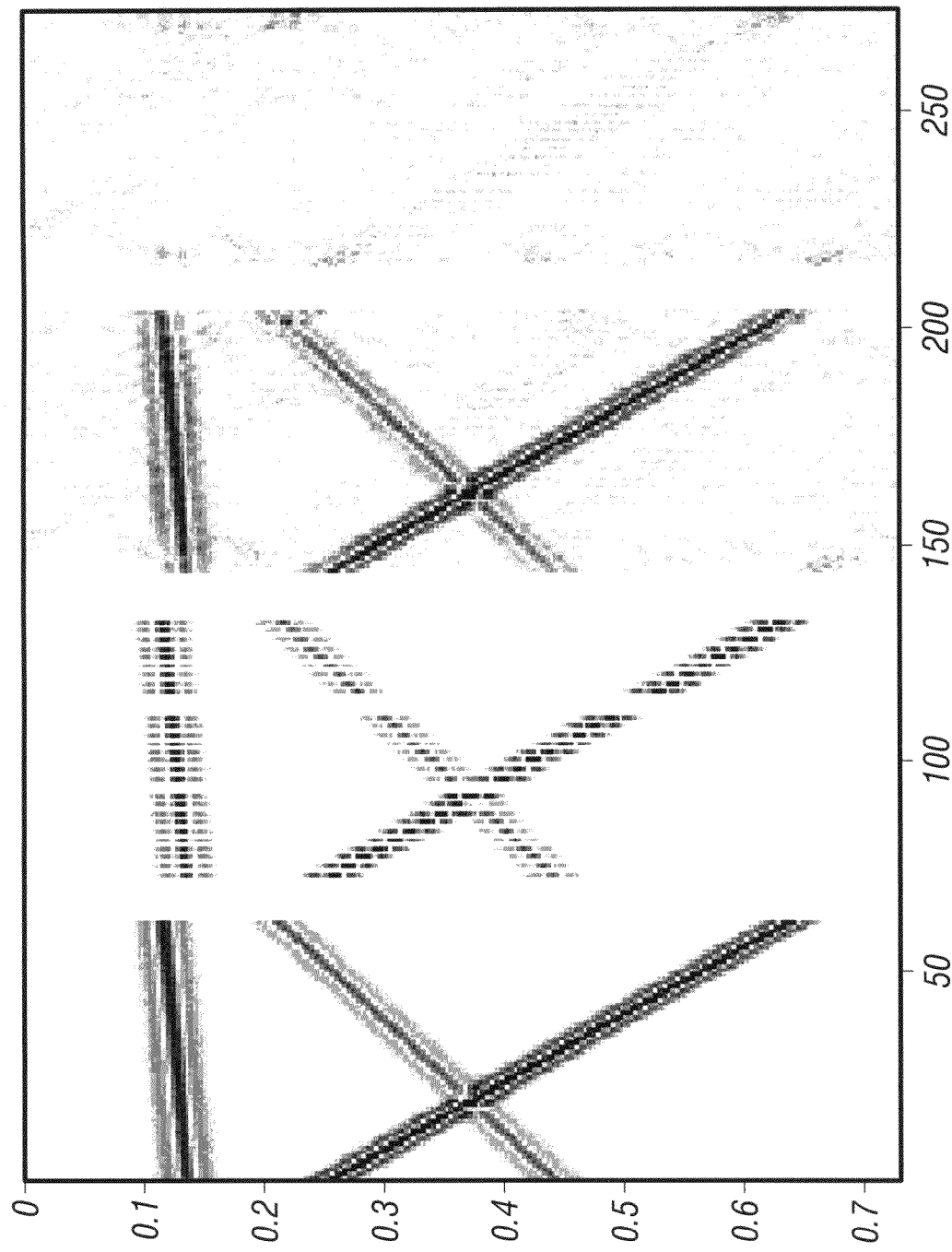

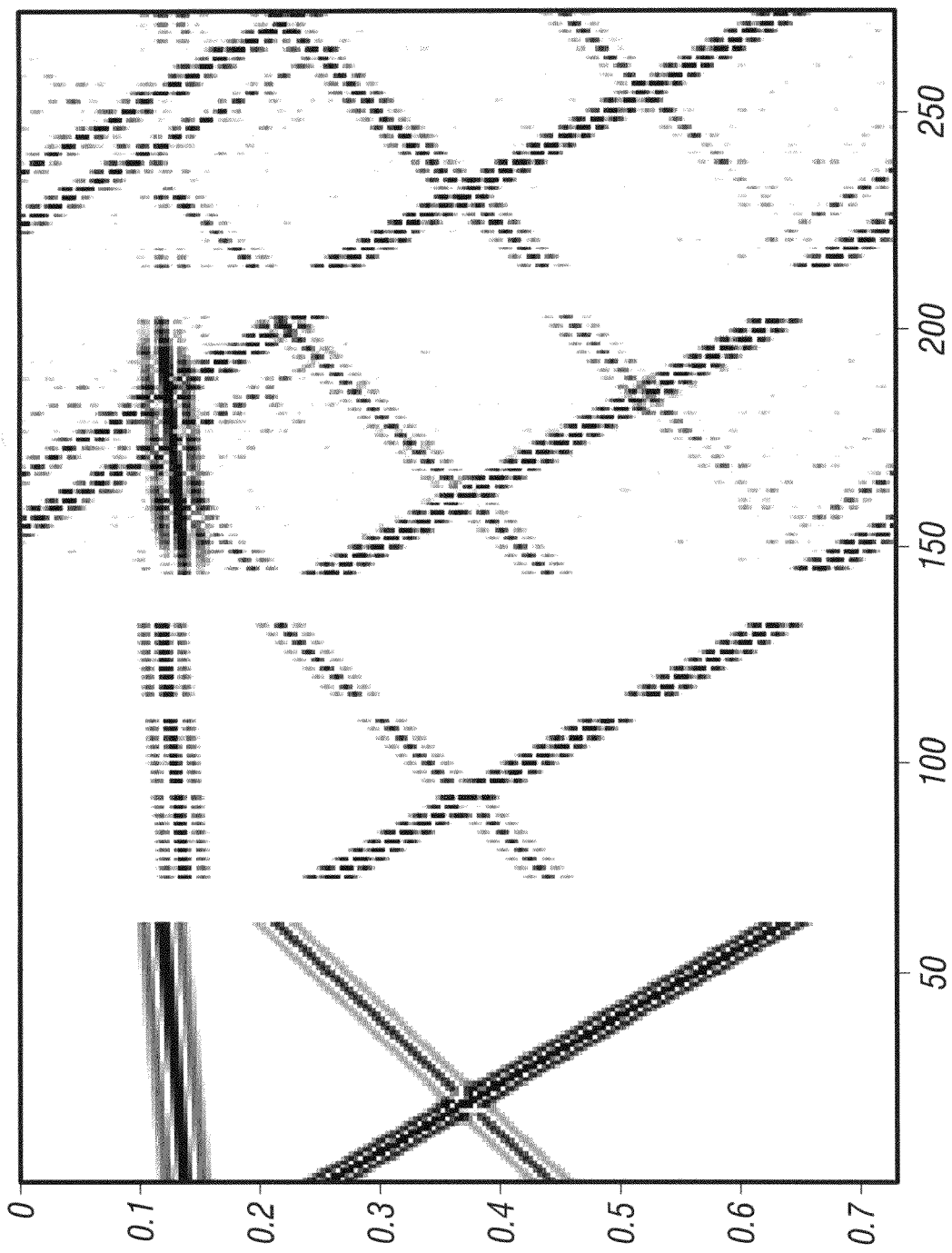

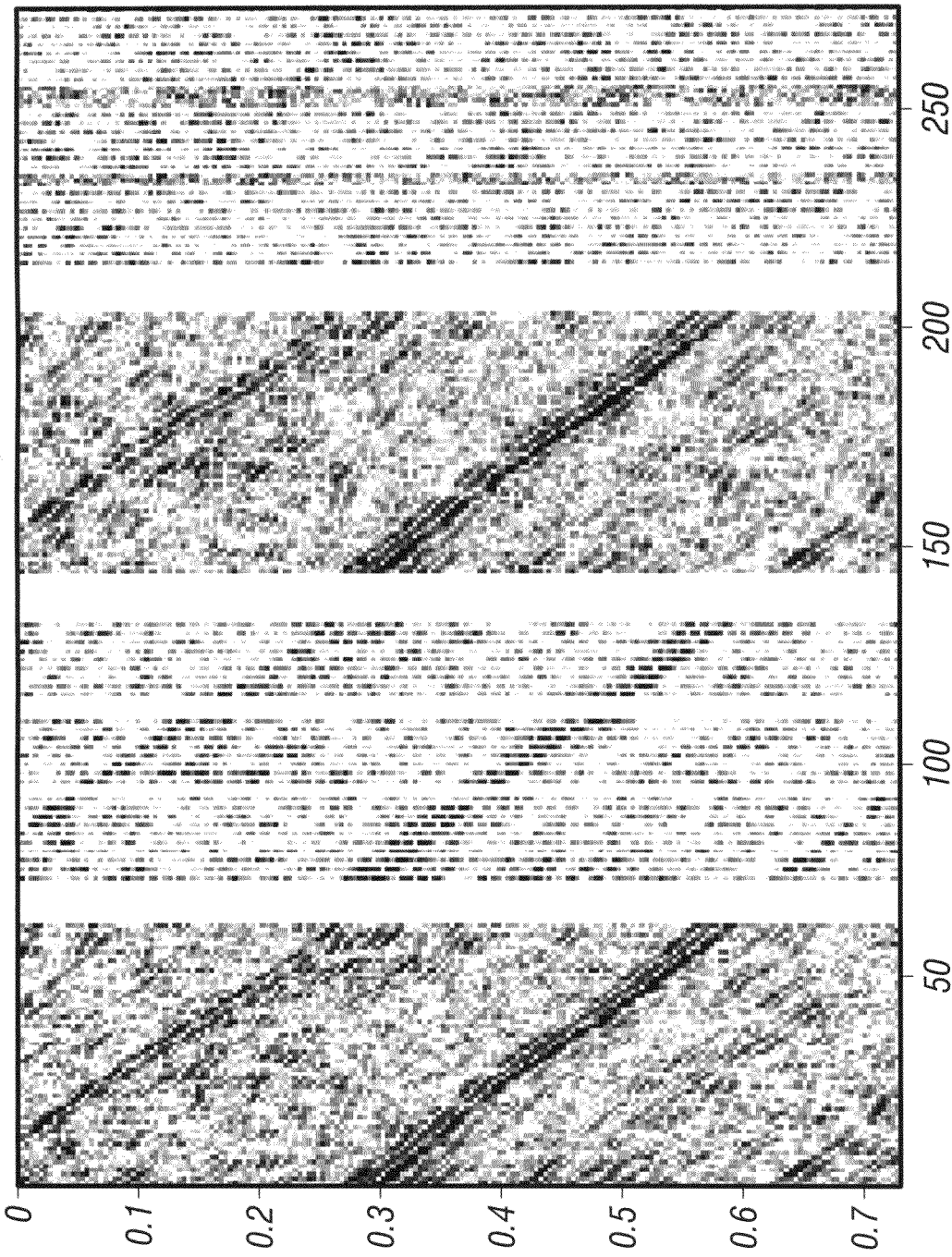

METHOD FOR INTERPOLATING SEISMIC DATA BY ANTI-ALIAS, ANTI-LEAKAGE FOURIER TRANSFORM

CROSS-REFERENCES TO RELATED APPLICATIONS

Not Applicable

FEDERALLY SPONSORED RESEARCH OR DEVELOPMENT

Not Applicable

SEQUENCE LISTING, TABLE, OR COMPUTER LISTING

Not Applicable

BACKGROUND OF THE INVENTION

1. Field of the Invention

This invention relates generally to the field of geophysical prospecting. More particularly, the invention relates to the field of interpolating or regularizing traces in seismic data.

2. Description of the Related Art

In the oil and gas industry, geophysical prospecting is commonly used to aid in the search for and evaluation of subterranean formations. Geophysical prospecting techniques yield knowledge of the subsurface structure of the earth, which is useful for finding and extracting valuable mineral resources, particularly hydrocarbon deposits such as oil and natural gas. A well-known technique of geophysical prospecting is a seismic survey. In a land-based seismic survey, a seismic signal is generated on or near the earth's surface and then travels downward into the subsurface of the earth. In a marine seismic survey, the seismic signal may also travel downward through a body of water overlying the subsurface of the earth. Seismic energy sources are used to generate the seismic signal which, after propagating into the earth, is at least partially reflected by subsurface seismic reflectors. Such seismic reflectors typically are interfaces between subterranean formations having different elastic properties, specifically sound wave velocity and rock density, which lead to differences in acoustic impedance at the interfaces. The reflected seismic energy is detected by seismic sensors (also called seismic receivers) at or near the surface of the earth, in an overlying body of water, or at known depths in boreholes and recorded.

The appropriate seismic sources for generating the seismic signal in land seismic surveys may include explosives or vibrators. Marine seismic surveys typically employ a submerged seismic source towed by a ship and periodically activated to generate an acoustic wavefield. The seismic source generating the wavefield may be of several types, including a small explosive charge, an electric spark or arc, a marine vibrator, and, typically, a gun. The seismic source gun may be a water gun, a vapor gun, and, most typically, an air gun. Typically, a marine seismic source consists not of a single source element, but of a spatially-distributed array of source elements. This arrangement is particularly true for air guns, currently the most common form of marine seismic source.

The appropriate types of seismic sensors typically include particle velocity sensors, particularly in land surveys, and water pressure sensors, particularly in marine surveys. Sometimes particle displacement sensors, particle acceleration sensors, or pressure gradient sensors are used in place of or in addition to particle velocity sensors. Particle velocity sensors and water pressure sensors are commonly known in the art as geophones and hydrophones, respectively. Seismic sensors may be deployed by themselves, but are more commonly deployed in sensor arrays. Additionally, pressure sensors and particle velocity sensors may be deployed together in a marine survey, collocated in pairs or pairs of arrays.

In a typical marine seismic survey, a seismic survey vessel travels on the water surface, typically at about 5 knots, and contains seismic acquisition equipment, such as navigation control, seismic source control, seismic sensor control, and recording equipment. The seismic source control equipment causes a seismic source towed in the body of water by the seismic vessel to actuate at selected times. Seismic streamers, also called seismic cables, are elongate cable-like structures towed in the body of water by the seismic survey vessel that tows the seismic source or by another seismic survey ship. Typically, a plurality of seismic streamers are towed behind a seismic vessel. The seismic streamers contain sensors to detect the reflected wavefields initiated by the seismic source and reflected from reflecting interfaces. Conventionally, the seismic streamers contain pressure sensors such as hydrophones, but seismic streamers have been proposed that contain water particle velocity sensors such as geophones or particle acceleration sensors such as accelerometers, in addition to hydrophones. The pressure sensors and particle motion sensors may be deployed in close proximity, collocated in pairs or pairs of arrays along a seismic cable.

The resulting seismic data obtained in performing the survey is processed to yield information relating to the geologic structure and properties of the subterranean formations in the area being surveyed. The processed seismic data is processed for display and analysis of potential hydrocarbon content of these subterranean formations. The goal of seismic data processing is to extract from the seismic data as much information as possible regarding the subterranean formations in order to adequately image the geologic subsurface. In order to identify locations in the Earth's subsurface where there is a probability for finding petroleum accumulations, large sums of money are expended in gathering, processing, and interpreting seismic data. The process of constructing the reflector surfaces defining the subterranean earth layers of interest from the recorded seismic data provides an image of the earth in depth or time.

The image of the structure of the Earth's subsurface is produced in order to enable an interpreter to select locations with the greatest probability of having petroleum accumulations. To verify the presence of petroleum, a well must be drilled. Drilling wells to determine whether petroleum deposits are present or not, is an extremely expensive and time-consuming undertaking. For that reason, there is a continuing need to improve the processing and display of the seismic data, so as to produce an image of the structure of the Earth's subsurface that will improve the ability of an interpreter, whether the interpretation is made by a computer or a human, to assess the probability that an accumulation of petroleum exists at a particular location in the Earth's subsurface.

Two problems can arise in the collection of seismic data, whether on land or in water. The data may be under-sampled (aliased) or the data may be non-uniformly (irregularly) sampled. Physical and economic limitations in a seismic survey often cause seismic data to be acquired either as under-sampled or non-uniformly sampled Under-sampled data is commonly referred to as aliased data. From data sampling theory, it is desired that no wavelength embedded in the data be shorter than twice the sampling interval. Otherwise, the feature corresponding to the embedded wavelength will be under-resolved and hence distorted due to the aliasing.

Thus, the temporal alias frequency at which aliasing begins, the Nyquist frequency, is $$f = \frac{1}{2\Delta t}$$

in the frequency-wavenumber (f-k) domain. The spatial alias frequency at which aliasing begins, the Nyquist wavenumber, is $$k = \frac{\pi}{\Delta x}$$

in the spatial coordinates. Here $\Delta t$ is the sample-time interval in milliseconds and $\Delta x$ is the station spacing in preferred units, such as meters. Thus, a large sampling interval in the time-space (t-x) domain corresponds to a small Nyquist frequency and Nyquist wave number in the corresponding f-k domain.

Recording the seismic data with much larger sampling intervals than ideally desired can lead to harmful effects in subsequent data processing. However, collecting data on a finer sampling interval during the seismic survey significantly adds to the cost of seismic data acquisition, particularly in the case of 3D surveying. So, instead, missing data can be approximated from the acquired data. Thus, some benefit must be sought by interpolating or extrapolating spatially aliased seismic data.

Interpolation of traces in unaliased, uniformly sampled seismic data is straightforward. The interpolation can be performed, for example, by convolution with a sinc filter in the spatial domain or by extending the Nyquist wavenumber of a band-limited signal through zero padding in the Fourier domain. However, this easier trace interpolation assumes that the interpolation is done with orthogonal basis functions. The energy of the signal in the data leaks to all the other frequencies when the trace interpolations are performed on an irregularly sampled grid. The energy leakage is caused by the irregularities of sampling and boundary effects.

Thus, non-uniformly sampled data needs to be regularized to an orthogonal (regular) basis grid. Three-dimensional seismic data regularization requires generating seismic traces at locations where the acquisition at the source and receiver positions did not take place during the seismic survey. In other words, seismic traces from the acquired data on an irregular grid are interpolated or extrapolated to a regular grid.

Marine seismic data in particular are usually irregularly and sparsely sampled along the spatial directions for many reasons, including cable feathering, obstacle avoidance, editing of bad traces, and economics. However, regularly sampled data are required for several seismic processing applications, including 3D surface-related multiple elimination and 3D wave equation migration. The best way to obtain 3D regularly sampled data is to acquire more data, with more redundancy in the crossline direction and with a wider azimuth range, but this is expensive and difficult to achieve because of current marine acquisition technology. Therefore, data regularization becomes an important processing tool.

Thus, a need exists for a method for interpolating traces in seismic data that is both under-sampled and non-uniformly sampled. In particular, a need exists for a method of trace interpolation that attenuates the energy leakage due to irregular sampling in aliased seismic data.

BRIEF SUMMARY OF THE INVENTION

The invention is a method for interpolating traces in seismic data that may be both under-sampled and non-uniformly sampled. An estimated frequency-wavenumber spectrum is generated by applying a first Anti-leakage Fourier transform method to unaliased frequency components in temporal-transformed seismic data and applying a second Anti-leakage Fourier transform method to aliased frequency components in the temporal-transformed seismic data. The second Anti-leakage Fourier transform method applies an absolute frequency-wavenumber spectrum extrapolated from unaliased frequencies to aliased frequencies to weight frequency-wavenumber components of the aliased frequencies. An inverse temporal and spatial Fourier transform is applied to the estimated frequency-wavenumber spectrum, generating trace interpolation of the seismic data.

BRIEF DESCRIPTION OF THE DRAWINGS

The invention and its advantages may be more easily understood by reference to the following detailed description and the attached drawings, in which:

FIG. 1 is a flowchart illustrating a first embodiment of the invention for interpolating traces in seismic data that is both under-sampled and non-uniformly sampled;

FIGS. 9A-9D show the method of the invention, as applied to a synthetic data example;

FIGS. 10A-10D show a standard ALFT method, as applied to the synthetic data example in FIGS. 9A-9D;

FIGS. 12A-12D show a standard ALFT method, as applied to the field data example in FIGS. 11A-11D.

Figure 2:
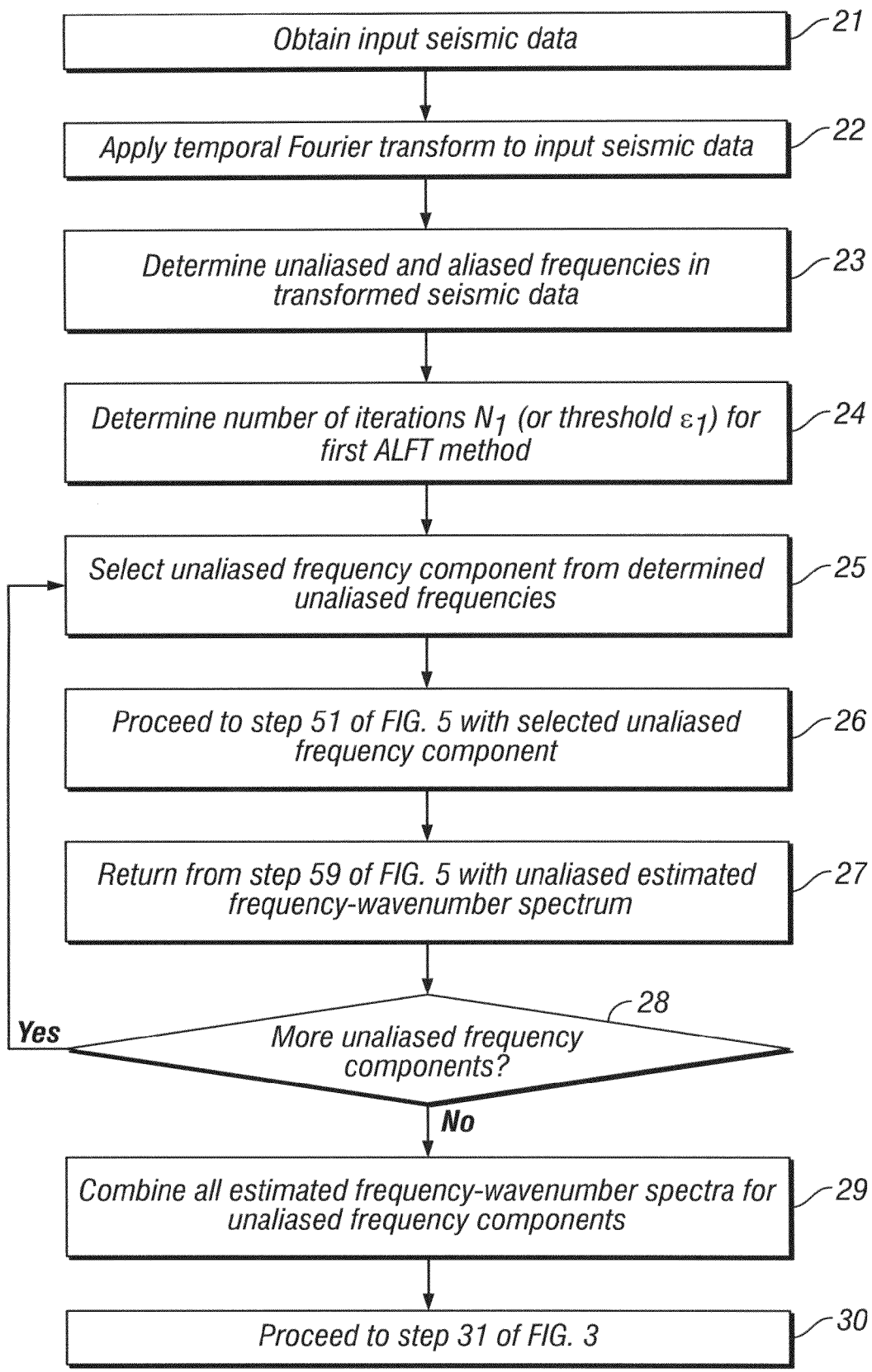
FIG. 2 is a flowchart illustrating the initial portion of a second embodiment of the invention for interpolating traces in seismic data that is both under-sampled and non-uniformly sampled.

While the invention will be described in connection with its preferred embodiments, it will be understood that the invention is not limited to these. On the contrary, the invention is intended to cover all alternatives, modifications, and equivalents that may be included within the scope of the invention, as defined by the appended claims.

DETAILED DESCRIPTION OF THE INVENTION

The most straightforward trace interpolation method is a 1-D interpolation in the space direction at each time sample by Fourier transforming in the wavenumber (k) direction, padding a large enough number of zero samples, and inverse Fourier transforming. This trace interpolation can equivalently be done in the frequency-wavenumber (f-k) domain for each frequency slice of data. The process is the deterministic data independent, sinc (or sine cardinal) function, trace interpolator. This process works well as long as the seismic data is not under-sampled (aliased) or non-uniformly sampled (on an irregular grid).

Trace interpolation as seismic data regularization, which aims to estimate the seismic traces on a spatially regular grid using the acquired irregularly-sampled data, is an interpolation/extrapolation problem. The Fourier transform plays a crucial role of estimating the frequency components in the frequency-wavenumber domain, and its inverse Fourier transform recreates the seismic data on the desired regular grid back in the time-space domain. The fundamental problem for Fourier transform based data reconstruction is that the global basis functions, such as the sinc functions, are not orthogonal on an irregular grid. The non-orthogonality of the global Fourier basis results in the energy from one frequency component leaking onto others, a phenomenon called "spectral leakage".

The invention is a method for interpolating traces in seismic data that may be both under-sampled and non-uniformly sampled. The invention builds upon the "Anti-leakage Fourier transform" (ALFT) method for interpolation of missing traces. The ALFT was proposed to solve the seismic data regularization problem by reducing the frequency leakage phenomenon for data sampled on an irregular grid. The ALFT "re-orthogonalizes" the global Fourier basis functions on an irregularly sampled grid, which leads to a good estimate of the signal's spectrum on the irregular grid.

For standard Fourier summation methods, the sequence of solving for each Fourier coefficient has no effect on the final results. However, the order is crucial in ALFT methods, because the Fourier coefficients with larger magnitude (energy) will contribute more energy leakage than coefficients with smaller magnitudes. Thus, to reduce the leakage, the Fourier coefficients are estimated iteratively, at each point estimating the coefficient with the maximum energy. After each estimation, the calculated frequency component (Fourier coefficient) will be reset to zero by updating the input data. Mathematically, it is equivalent to removing the frequency component from the original input seismic data.

This newly subtracted input is used to solve for the next Fourier coefficient, again using the same maximum energy criterion. This iterative procedure is repeated until all Fourier coefficients are resolved, that is, until all the values in the updated input tend to zero (practically, below a threshold). In general, the global Fourier basis functions are only orthogonal on a regular grid, that is, for regularly-sampled data. The subtraction acts as an orthogonalization mechanism for the Fourier basis on an irregular grid. In other words; the Fourier basis functions are re-orthogonalized. This method leads to a practical solution for minimizing the leakage effect from one frequency to another.

If the number and range of Fourier components used is sufficient, then the final updated input data on the irregular grid will tend to zero after all the subtraction operations. In this case, the reconstructed data from the obtained Fourier coefficients will match the original measurements, one of the requirements for a desired interpolation method.

The problem with the standard ALFT method is in handling aliased data (in the presence of noise). An aliased component may be of equal or greater magnitude than an unaliased component and may erroneously be picked out of sequence by the ALFT method. The method of the invention expands upon the ALFT method by using information from lower, unaliased temporal frequencies, to help "de-alias" the higher temporal frequencies. In particular, the invention uses the unaliased lower frequencies to design a weighting function that determines which spectral components are calculated (and removed) first in the ALFT procedure. The weighting function is constructed by extrapolating the frequency-wavenumber spectrum at the unaliased frequencies to the aliased frequencies.

Figure 3:
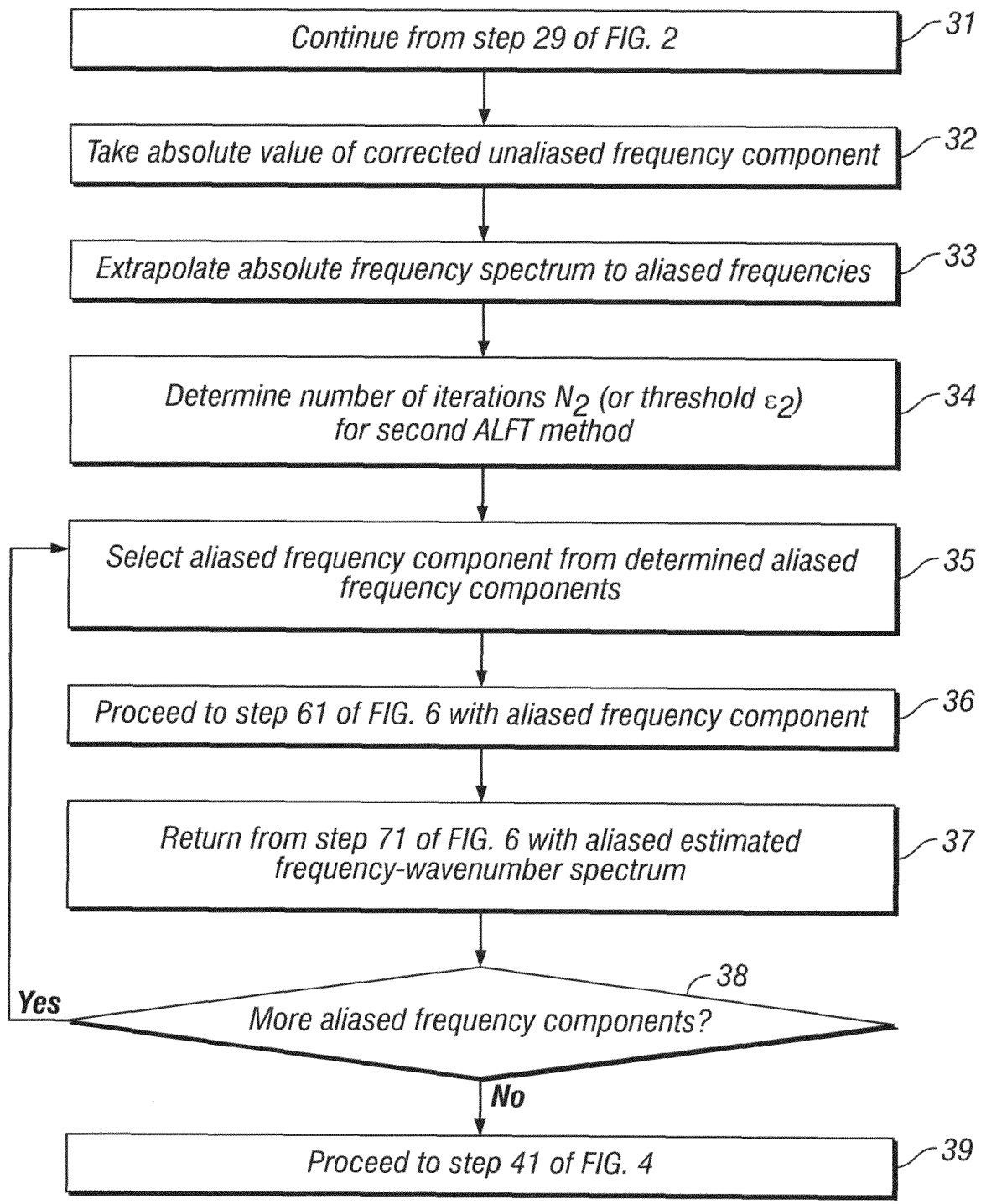
FIG. 3 shows a flowchart illustrating the intermediate portion of the second embodiment of the invention for interpolating traces in seismic data that was begun in FIG. 2.
Figure 4:
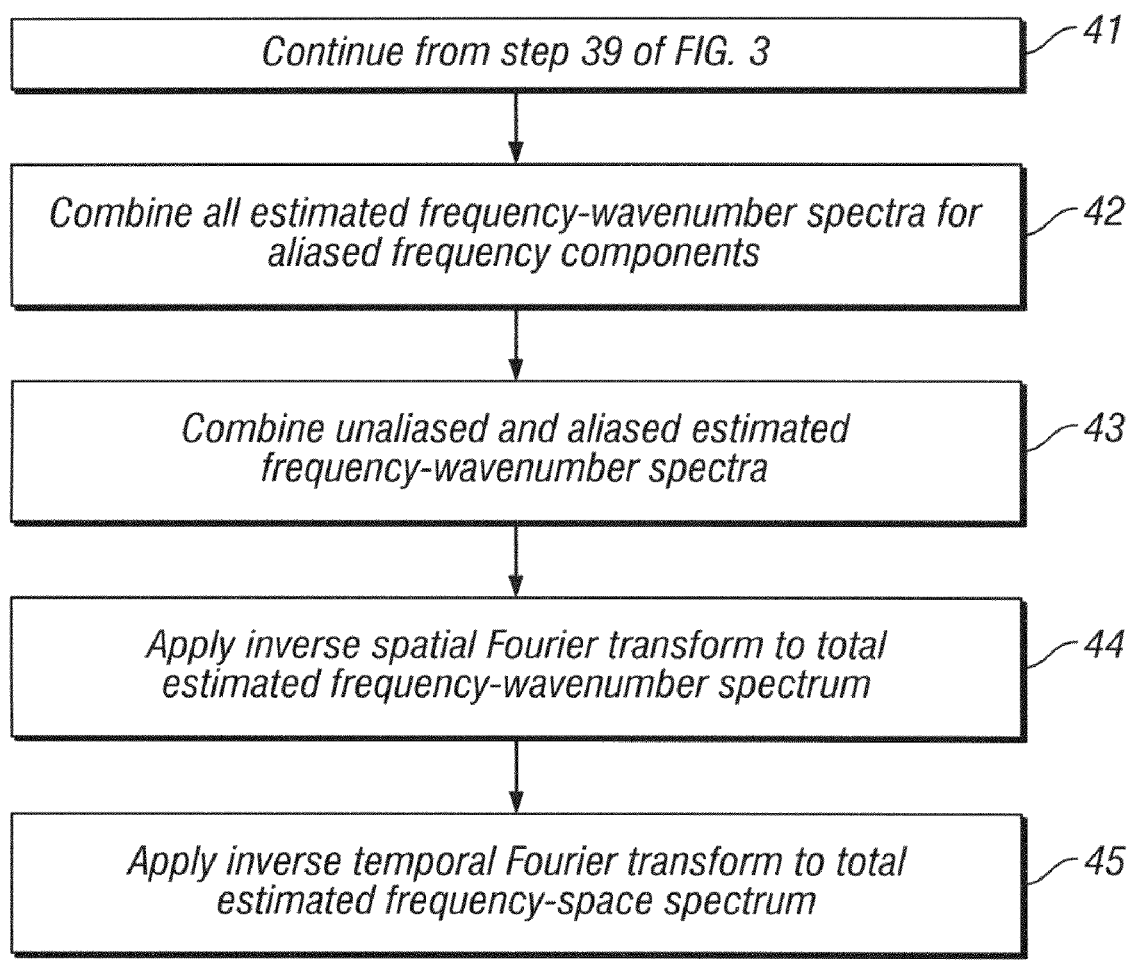
FIG. 4 shows a flowchart illustrating the final portion of the second embodiment of the invention for interpolating traces in seismic data that was begun in FIG. 2.
Figure 5:
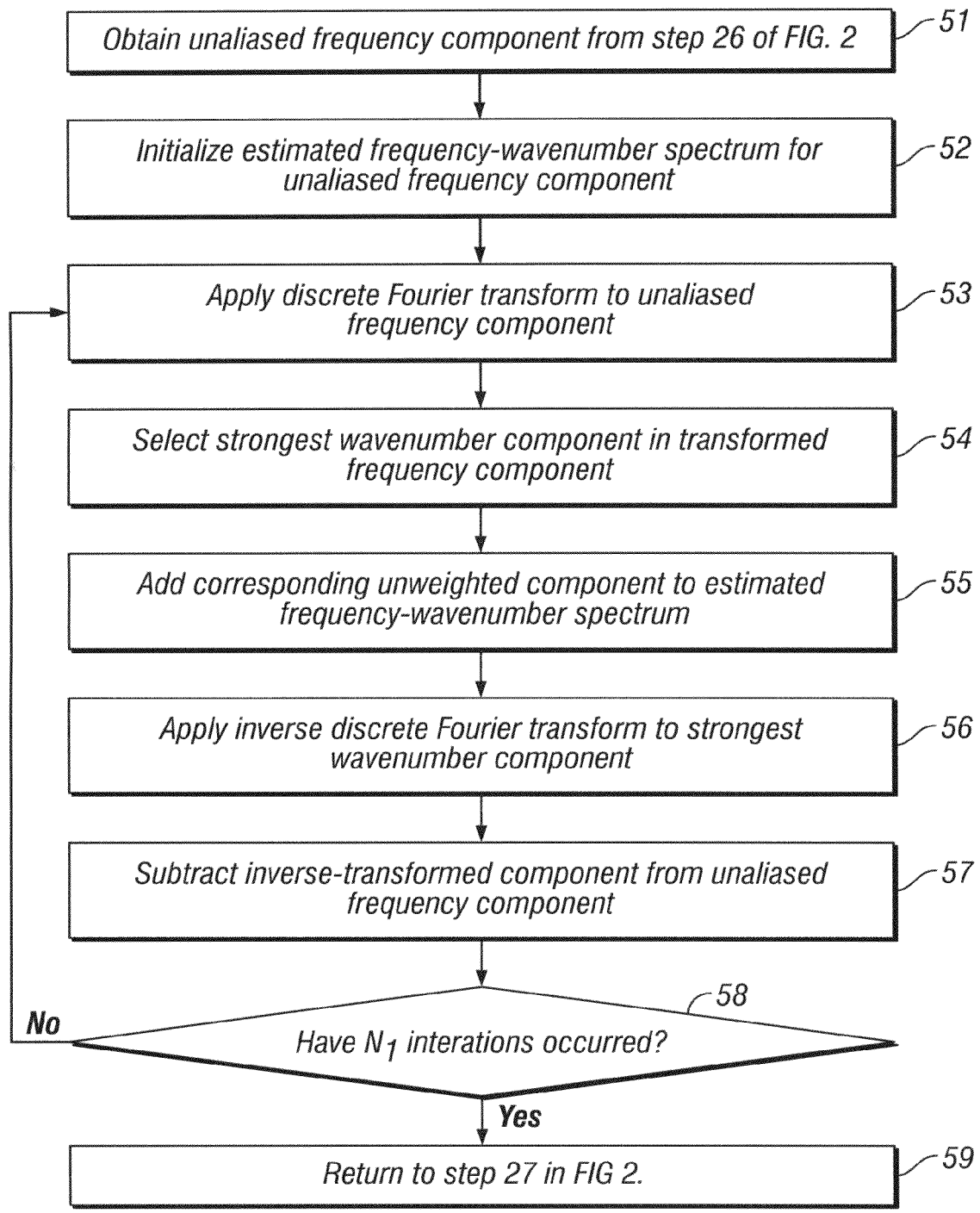
FIG. 5 is a flowchart illustrating an embodiment of the invention for processing unaliased frequencies in non-uniformly sampled seismic data from FIG. 2.
Figure 6:
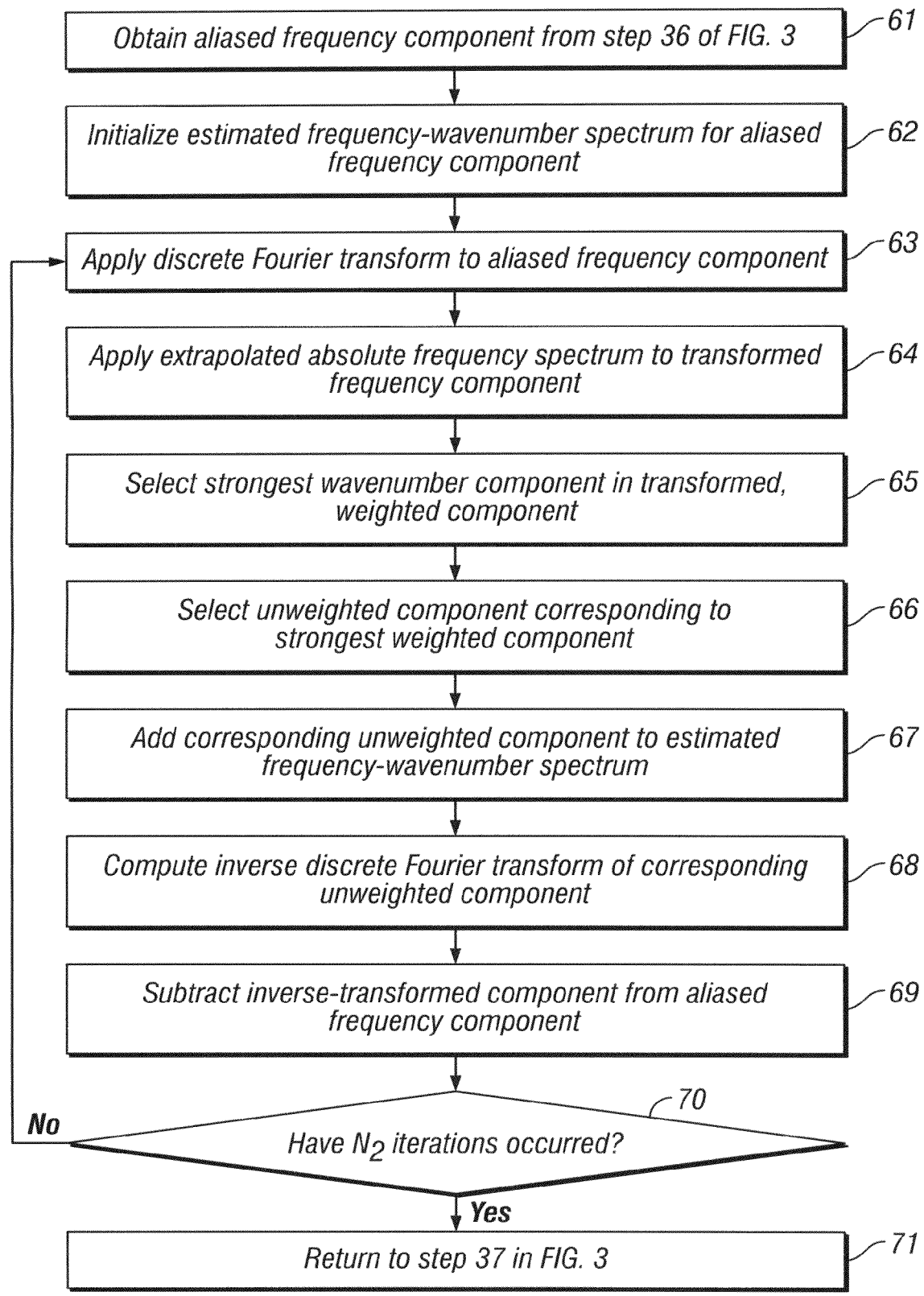
FIG. 6 is a flowchart illustrating an embodiment of the invention for processing aliased frequencies in non-uniformly sampled seismic data from FIG. 3.
Figure 7:
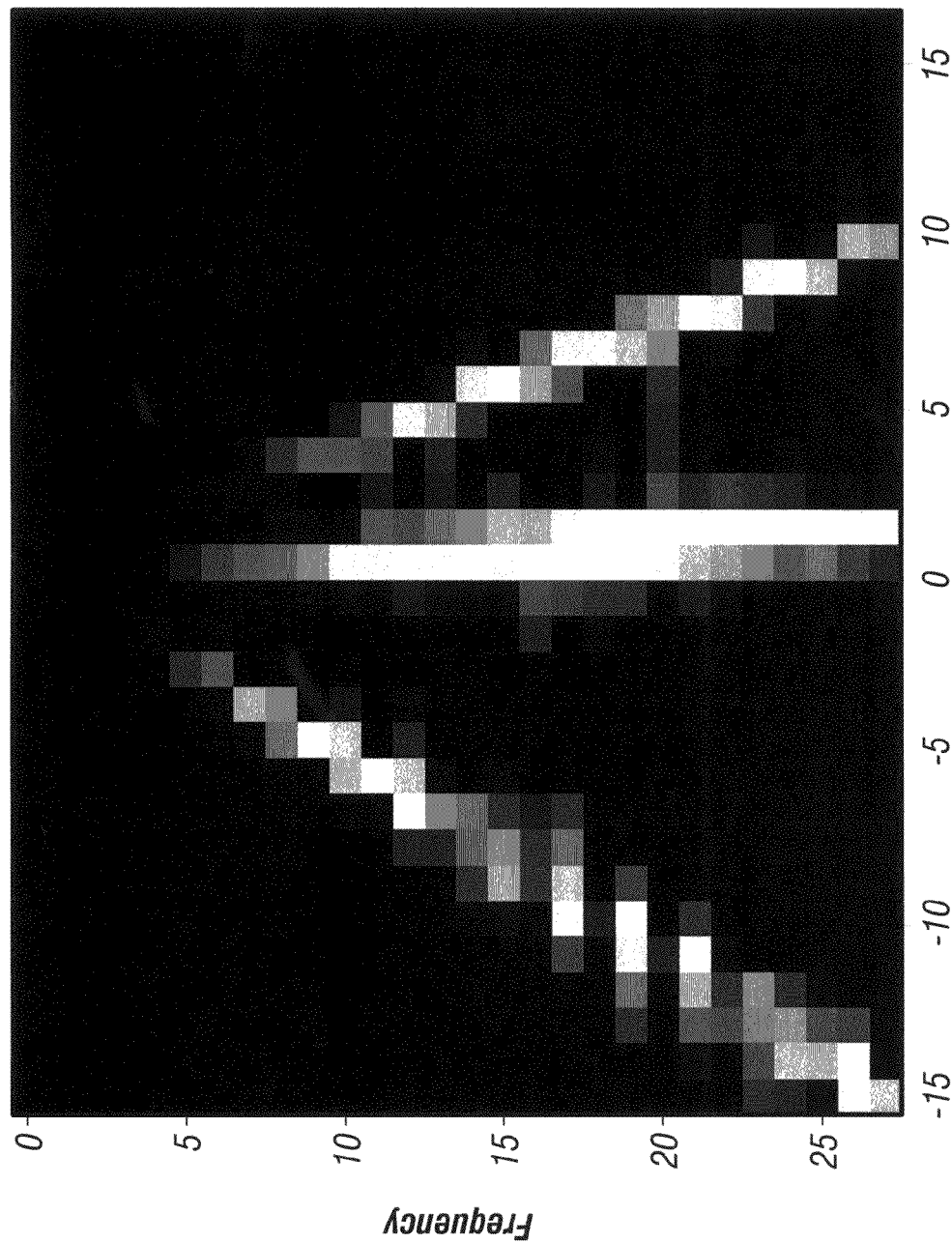
FIG. 7 shows a diagram of a frequency-wavenumber spectrum at the lower, unaliased frequencies.

FIGS. 1-6 are flowcharts illustrating embodiments of the invention for trace interpolation. FIG. 1 and FIGS. 2-4, respectively, show two embodiments of the method of the invention, while FIGS. 5 and 6 show further details of the method shown in FIGS. 2-4. FIGS. 7-12 illustrate some of the techniques described in the flowcharts discussed in reference to FIGS. 1-6. FIGS. 6 and 7 illustrate the spectrums used in the weighting technique. FIGS. 9A-9D and 10A-10D illustrate the results of the trace interpolation process for the method of the invention and for standard ALFT, respectively, for a synthetic example. FIGS. 11A-11D and 12A-12D illustrate the results of the trace interpolation process for the method of the invention and for standard ALFT, respectively, for a field data example.

FIG. 1 shows a flowchart illustrating a first embodiment of the invention for interpolating traces in an input seismic data set that is both under-sampled and non-uniformly sampled.

At box 11, an estimated frequency-wavenumber spectrum is generated. A first, standard Anti-leakage Fourier transform method is applied to unaliased frequency components of temporal-transformed seismic data and, a second, non-standard Anti-leakage Fourier transform method is applied to aliased frequency components of the temporal-transformed seismic data seismic data. The second Anti-leakage Fourier transform method applies an absolute frequency-wavenumber spectrum extrapolated from (typically lower) unaliased frequencies to (typically higher) aliased frequencies to weight the aliased frequencies.

At box 12, an inverse temporal and spatial Fourier transform is applied to the estimated frequency-wavenumber spectrum from box 11, generating an estimated data set. The estimated frequency-wavenumber spectrum is inverse-transformed from the frequency-wavenumber (f-k) domain back to the time-space (t-x) domain, resulting in the desired trace interpolation of the input seismic data.

FIG. 2 shows a flowchart illustrating the initial portion of a second embodiment of the invention for interpolating traces in seismic data that is both under-sampled and non-uniformly sampled. FIG. 2 expands upon the discussion of the first embodiment discussed above in reference to FIG. 1.

At box 21, input seismic data is obtained. The seismic data is assumed to be expressed in the time-space (t-x) domain. The seismic data may be both aliased and irregularly-sampled, as the method of the invention is adapted to handle both conditions.

At box 22, a temporal Fourier transform is applied to the input seismic data obtained in box 21. Preferably, the Fourier transform applied is a Fast Fourier Transform (FFT), for computational efficiency. The input data is transformed from the time-space (t-x) domain to the frequency-space (f-x) domain.

At box 23, it is determined which frequency components from the transformed input seismic data from box 22 are unaliased and which frequency components are aliased. Typically, lower frequencies will be unaliased and higher frequencies will be aliased.

At box 24, a first number of iterations, designated $N_1$, is selected for the first ALFT method, which is to be applied to the unaliased frequencies determined in box 23. The number $N_1$ is empirically derived for the first ALFT method.

In an alternative embodiment, a first threshold $\epsilon_1$ is selected for the first ALFT method instead of the first number of iterations, $N_1$. Then, the first ALFT method is applied iteratively to each Fourier coefficient until the coefficient is decreased below the first threshold $\epsilon_1$, rather than for a set number of iterations. The method of the invention is illustrated for the embodiment using the number of iterations for illustrative purposes only, and this choice should not be considered a limitation of the invention.

At box 25, an unaliased frequency component is selected from the frequency components determined to be unaliased in box 23.

At box 26, the process proceeds to box 51 of FIG. 5 with the unaliased frequency component selected in box 25. There, in FIG. 5, a first (standard) ALFT method will be applied to unaliased frequencies.

At box 27, an estimated frequency-wavenumber spectrum for the selected unaliased frequency component is obtained from box 59 of FIG. 5.

At box 28, it is determined if more unaliased frequency components remain to be selected. If more unaliased frequency components remain, then the process returns to box 25. If no more unaliased frequency components remain, then the process continues on to the next box, 29.

At box 29, all the estimated frequency-wavenumber spectra for the selected unaliased frequency components from box 27 are combined into an unaliased estimated frequency-wavenumber spectrum.

At box 30, the process ends for FIG. 2 and proceeds on to box 31 of FIG. 3 with the unaliased estimated frequency-wavenumber spectrum from box 29.

FIG. 3 shows a flowchart illustrating the intermediate portion of the second embodiment of the invention for interpolating traces in seismic data that was begun in FIG. 2.

At box 31, the process continues from box 29 of FIG. 2 with the unaliased estimated frequency-wavenumber spectrum.

At box 32, an absolute value is taken of the unaliased estimated frequency-wavenumber spectrum from box 31, generating an absolute frequency spectrum in the frequency-wavenumber (f-k) domain for the unaliased frequencies.

At box 33, the absolute frequency-wavenumber spectrum from box 32 is extrapolated to the aliased frequencies, generating an extrapolated absolute frequency-wavenumber spectrum in the frequency-wavenumber (f-k) domain for the aliased frequencies. Typically, the aliased frequencies comprise the higher frequencies and wavenumbers. The extrapolated spectrum effectively contains information from the unaliased lower frequencies, and this information will give improved selection of the unaliased Fourier components at the aliased higher frequencies.

Figure 8:
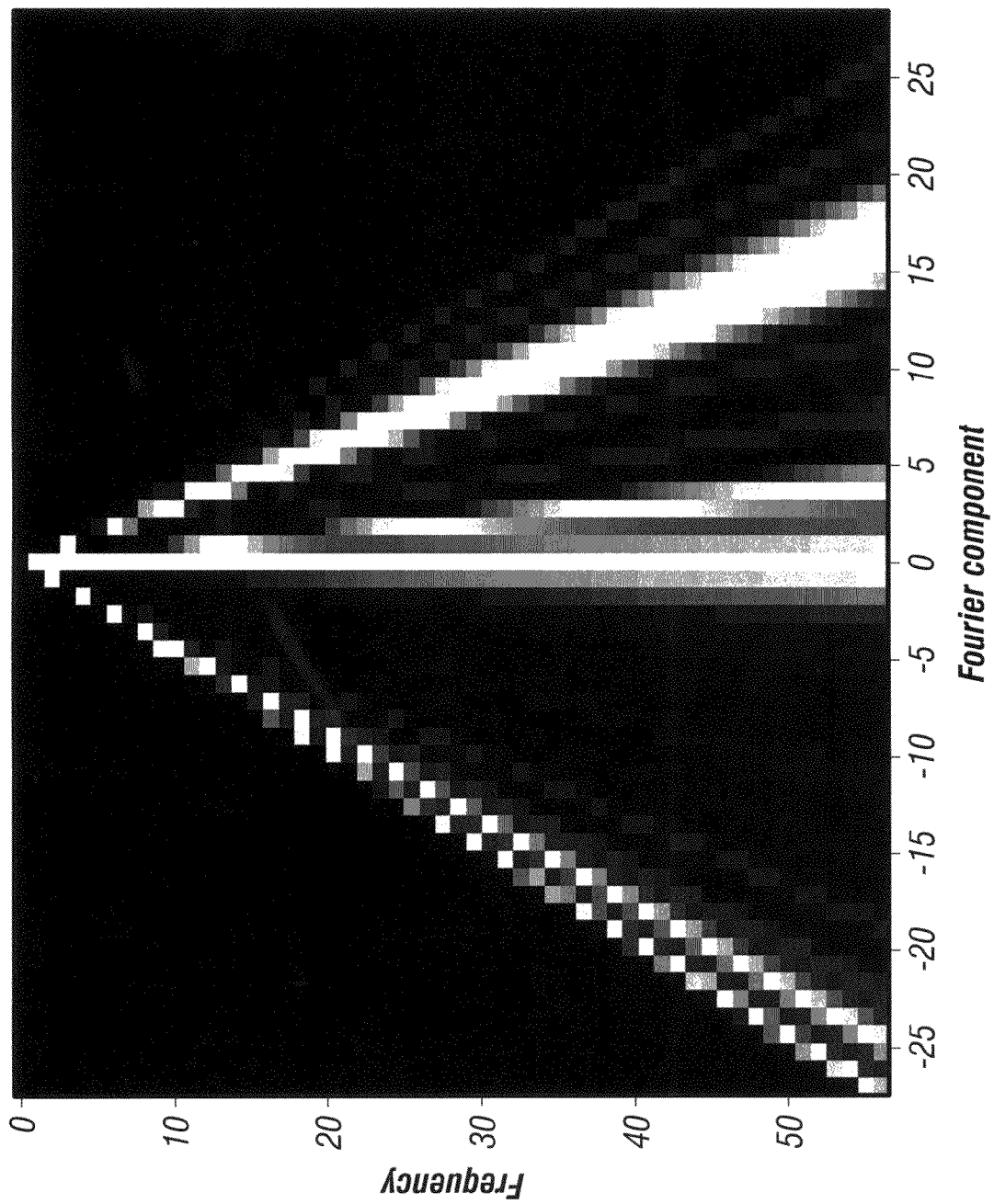
FIG. 8 shows a diagram of the extrapolated frequency-wavenumber spectrum, used as a weighting function for the higher, aliased frequencies.

FIGS. 7-8 illustrate example spectrums as would be computed in boxes 32 and 33. FIG. 7 shows a diagram of a frequency-wavenumber spectrum, as would be computed in box 32, at the lower frequencies, which are unaliased. FIG. 8 shows a diagram of the extrapolated frequency-wavenumber spectrum, as would be computed in box 33. This extrapolated spectrum is used as a weighting function for the higher frequencies, some of which are aliased.

In principle, the lower frequencies are extrapolated to the higher frequencies and consequently, to a larger bandwidth, or wavenumbers. In practice, the lower frequency spectrum is interpolated in both frequency and wavenumber values. The interpolation may include averaging or smoothing. FIG. 8 shows the results of a 2:1 interpolation.

At box 34, a second number of iterations, designated $N_2$, is selected for the second ALFT method, which is to be applied to the aliased frequencies determined in box 23 in FIG. 2. The number $N_2$ is empirically derived for the second ALFT method. In one embodiment, $N_1=N_2$, although typically, $N_1>N_2$. However, it is within the scope of the invention that a different number of iterations, N, be determined for each frequency component, that is, that the number of iterations be frequency-dependent.

In an alternative embodiment, a second threshold $\epsilon_2$ is selected for the second ALFT method instead of the second number of iterations, $N_2$. Then, the second ALFT method is applied iteratively to each Fourier coefficient until the coefficient is decreased below the second threshold $\epsilon_2$, rather than for a set number of iterations. The method of the invention is illustrated for the embodiment using the number of iterations for illustrative purposes only, and this choice should not be considered a limitation of the invention.

At box 35, an aliased frequency component is selected from the frequencies determined to be aliased in box 23 of FIG. 2.

At box 36, the process proceeds to box 61 of FIG. 6 with the aliased frequency component selected in box 35. There, in FIG. 6, a second (nonstandard) ALFT method of the invention will be applied to aliased frequencies.

At box 37, an estimated frequency-wavenumber spectrum for the selected aliased frequency component is obtained from box 71 of FIG. 6.

At box 38, it is determined if more aliased frequency components remain to be selected. If more aliased frequencies remain, then the process returns to box 35. If no more aliased frequencies remain, then the process continues on to the next box, 39.

At box 39, the process in FIG. 3 ends and proceeds to box 41 of FIG. 4 with the unaliased estimated frequency-wavenumber spectrum from box 31 and all the estimated frequency-wavenumber spectra for the selected aliased frequency components obtained from box 37.

FIG. 4 shows a flowchart illustrating the final portion of the second embodiment of the invention for interpolating traces in seismic data that was begun in FIG. 2 and continued in FIG. 3.

At box 41, the process continues from box 39 of FIG. 3 with the unaliased estimated frequency-wavenumber spectrum and all the estimated frequency-wavenumber spectra for the selected aliased frequency components.

At box 42, all the estimated frequency-wavenumber spectra for the selected aliased frequency components from box 41 are combined into an aliased estimated frequency-wavenumber spectrum.

At box 43, the unaliased and aliased estimated frequency-wavenumber spectra from boxes 41 and 42, respectively, are combined into a total estimated frequency-wavenumber spectrum.

At box 44, an inverse spatial Fourier transform is applied to the total estimated frequency-wavenumber spectrum from box 43, generating a total estimated frequency-space spectrum. The inverse spatial Fourier transform is designed to transform traces to desired trace positions, including the positions of missing traces or to positions on a regular (orthogonal) grid. Preferably, the inverse Fourier transform applied is an inverse spatial Discrete Fourier Transform (DFT) or a Nonuniform Fast Fourier Transform (NFFT), for computational efficiency. The total estimated frequency-wavenumber spectrum is inverse transformed from the frequency-wavenumber (f-k) domain to the total estimated frequency-space spectrum in the frequency-space (f-x) domain.

At box 45, an inverse temporal Fourier transform is applied to the transformed total estimated frequency-space spectrum from box 44, generating a total estimated data set. Preferably, the inverse Fourier transform applied is an inverse temporal Fast Fourier Transform (FFT). The total estimated frequency-space spectrum is further inverse transformed from the frequency-space (f-x) domain to the total estimated data set in the time-space (t-x) domain.

Alternatively, the inverse Fourier transform applied in boxes 44 and 45 is a 2-D (temporal and spatial) Fast Fourier Transform (FFT). In either case, the end result is that the estimated frequency-wavenumber spectrum is inverse-transformed from the frequency-wavenumber (f-k) domain back to the time-space (t-x) domain, generating the desired trace interpolation of the input seismic data. This trace interpolation of the input seismic data may accomplish many objectives, including filling in missing traces and regularizing the sampled traces.

For the unaliased frequencies determined in box 23 of FIG. 2, a standard ALFT is applied. FIG. 5 shows a flowchart illustrating an embodiment of the invention for processing unaliased frequencies in non-uniformly sampled seismic data from FIG. 2.

At box 51, a selected unaliased frequency component is obtained from box 26 of FIG. 2.

At box 52, an estimated frequency-wavenumber spectrum in the frequency-wavenumber (f-k) domain is established for the selected unaliased frequency component obtained in box 51. The estimated frequency-wavenumber spectrum is initially set to zero. This spectrum will be further built up by adding selected wavenumber components in box 55 below.

At box 53, a spatial Fourier transform is applied to the selected unaliased frequency component selected in box 51. Preferably, the Fourier transform applied is a Discrete Fourier Transform (DFT) or a Nonuniform Fast Fourier Transform (NFFT), for computational efficiency. The frequency component is transformed from the frequency-space (f-x) domain to the frequency-wavenumber (f-k) domain.

At box 54, the strongest wavenumber component in the transformed frequency component from box 53 is selected. The strongest wavenumber component is the Fourier component resulting from the spatial Fourier transform computed in box 53 which has the largest magnitude (energy).

At box 55, the strongest wavenumber component selected in box 54 is added to the estimated frequency-wavenumber spectrum, established and initialized in box 52, for the selected unaliased frequency component.

At box 56, an inverse spatial Fourier transform is applied to the strongest Fourier component selected in box 54. Preferably, the inverse Fourier transform applied is an inverse Discrete Fourier Transform (DFT) or an inverse Nonuniform Fast Fourier Transform (NFFT), for computational efficiency. The strongest Fourier component is inverse-transformed from the frequency-wavenumber (f-k) domain back to the frequency-space (f-x) domain.

At box 57, the inverse-transformed strongest component computed in box 56 is subtracted from the unaliased frequency component obtained in box 51. These subtractions iteratively generate a corrected unaliased frequency component.

At box 58, it is determined if $N_1$ iterations of boxes 53 through 57 have occurred for the unaliased frequency component obtained in box 51. If $N_1$ iterations have not occurred, then the process returns to box 53 for another iteration. If $N_1$ iterations have occurred, then the process in FIG. 5 continues on to box 59.

In the alternative embodiment described in box 24 of FIG. 2, it is determined if the corrected unaliased frequency component from box 57 is below the first threshold $\epsilon_1$ yet. If not below the threshold $\epsilon_1$, then the process returns to box 53 for another iteration. If below the threshold $\epsilon_1$, then the process in FIG. 5 continues on to box 59.

At box 59, the process ends for FIG. 5 and returns to box 27 in FIG. 2 with the estimated frequency-wavenumber spectrum for the selected unaliased frequency component iteratively constructed in box 55.

For the aliased frequencies determined in box 27 of FIG. 2, a nonstandard ALFT of the present invention is applied. FIG. 6 shows a flowchart illustrating an embodiment of the invention for processing aliased frequencies in non-uniformly sampled seismic data from FIG. 3.

At box 61, a selected aliased frequency component is obtained from box 36 of FIG. 3.

At box 62, an estimated frequency-wavenumber spectrum in the frequency-wavenumber (f-k) domain is established for the selected aliased frequency component obtained in box 51. The estimated frequency-wavenumber spectrum is initially set to zero. This spectrum will be further built up by adding selected wavenumber components in box 67 below.

At box 63, a spatial Fourier transform is applied to the selected aliased frequency component selected in box 61. Preferably, the Fourier transform applied is a Discrete Fourier Transform (DFT) or a Nonuniform Fast Fourier Transform (NFFT), for computational efficiency. The frequency component is transformed from the frequency-space (f-x) domain to the frequency-wavenumber (f-k) domain.

At box 64, the extrapolated absolute frequency-wavenumber spectrum from box 33 of FIG. 3 is applied to the transformed frequency component computed in box 63, to weight the wavenumber components in the transformed frequency component. An example of this extrapolated frequency-wavenumber spectrum is shown in FIG. 8.

At box 65, the strongest wavenumber component in the transformed and weighted frequency component from box 64 is selected. The strongest wavenumber component is the Fourier component resulting from the spatial Fourier transform computed in box 53 that has the largest magnitude (energy).

At box 66, the unweighted wavenumber component in the transformed frequency component from box 63 is obtained that corresponds to the strongest weighted wavenumber component determined in box 65.

At box 67, the unweighted wavenumber component obtained in box 66, corresponding to the strongest wavenumber component, is added to the estimated frequency-wavenumber spectrum, established and initialized in box 62, for the selected aliased frequency component.

At box 68, an inverse spatial Fourier transform is applied to the strongest unweighted component determined in box 66. Preferably, the inverse Fourier transform applied is an inverse Discrete Fourier Transform (DFT) or an inverse Nonuniform Fast Fourier Transform (NFFT), for computational efficiency. The strongest unweighted component is inverse-transformed from the frequency-wavenumber (f-k) domain back to the frequency-space (f-x) domain.

At box 69, the inverse-transformed strongest unweighted component computed in box 68 is subtracted from the aliased frequency component obtained in box 61. These subtractions iteratively generate a corrected aliased frequency component.

At box 70, it is determined if $N_2$ iterations of boxes 63 through 69 have occurred for the aliased frequency component obtained in box 51. If $N_2$ iterations have not occurred, then the process returns to box 63 for another iteration. If $N_2$ iterations have occurred, then the process continues on to box 71.

In the alternative embodiment described in box 34 of FIG. 3, it is determined if the corrected unaliased frequency component from box 69 is below the second threshold $\epsilon_2$ yet. If not below the threshold $\epsilon_2$, then the process returns to box 63 for another iteration. If below the threshold $\epsilon_2$, then the process in FIG. 6 continues on to box 71.

At box 71, the process ends for FIG. 6 and returns to box 37 in FIG. 3 with the estimated frequency-wavenumber spectrum for the selected aliased frequency component iteratively constructed in box 57.

FIGS. 9A-12D show the results of the trace interpolation process for the method of the invention and for standard ALFT, for comparison. FIGS. 9A-9D and 10A-10D illustrate the results of the trace interpolation process for a synthetic example, while FIGS. 11A-11D and 12A-12D illustrate the results of the trace interpolation process for a field data example.

FIGS. 9A-9D show the method of the invention, as applied to a synthetic data example. FIG. 9A shows the original synthetic seismic data. FIG. 9B shows the input data with traces removed to model aliased data. FIG. 9C shows the interpolated data, using the method of the invention. FIG. 9D shows the difference between the original data in FIG. 9A and the interpolated data in FIG. 9C, where the small difference indicates close agreement.

FIGS. 10A-10D show a standard ALFT method, as applied to the synthetic data example in FIGS. 9A-9D, for comparison. FIG. 10A shows the original synthetic seismic data, as in FIG. 9A. FIG. 10B shows the input data with traces removed to model aliased data, as in FIG. 9B. FIG. 10C shows the interpolated data, using a standard ALFT method. FIG. 9D shows the difference between the original data in FIG. 10A and the interpolated data in FIG. 10C, where the larger difference indicates not as close agreement as in FIG. 9D, above, for the method of the invention.

Figures 11A, 11B, 11C, 11D:
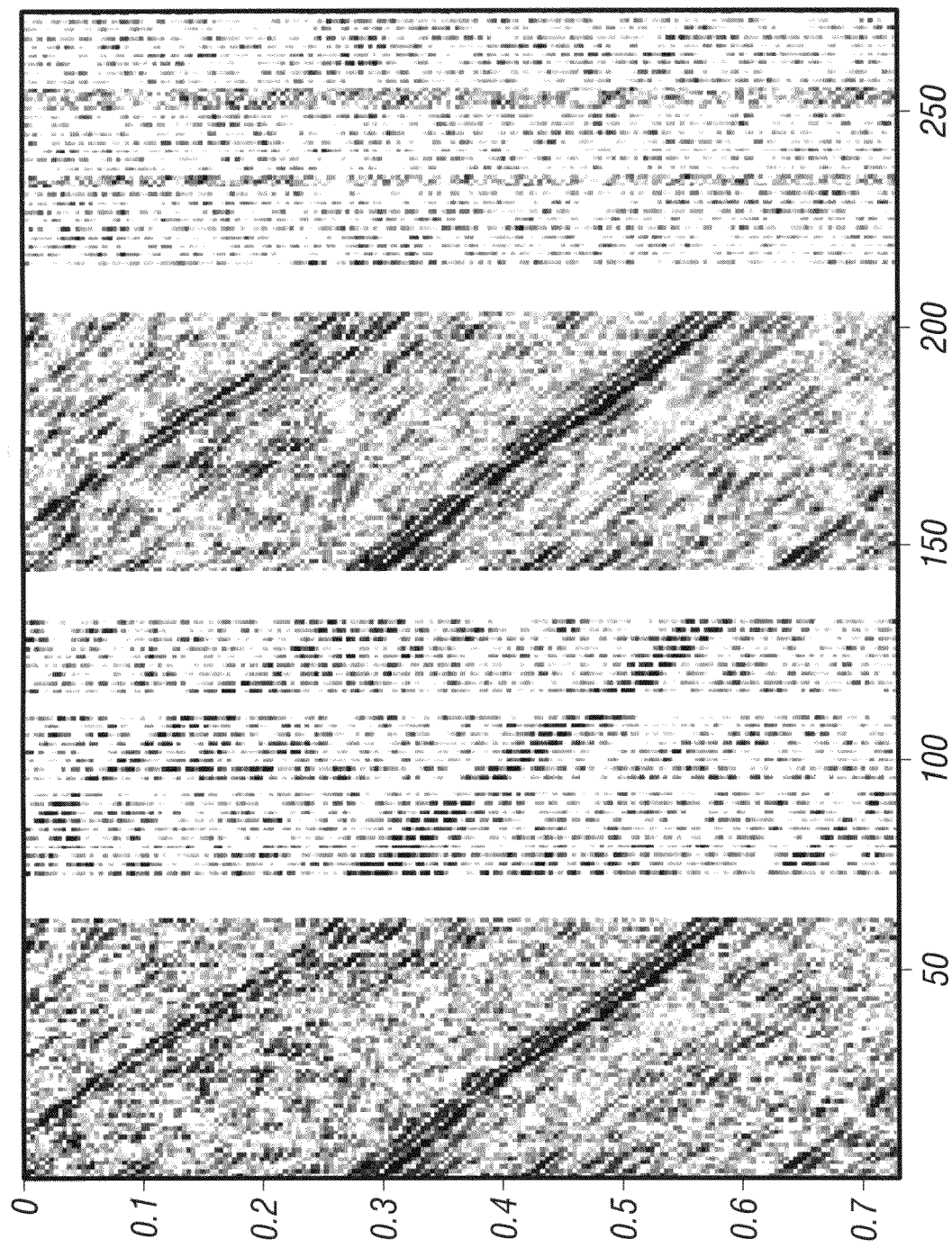
FIGS. 11A-11D show the method of the invention, as applied to a field data example.

FIGS. 11A-11D show the method of the invention, as applied to a field data example. FIG. 11A shows the original field seismic data. FIG. 11B shows the input data with traces removed to model aliased data. FIG. 11C shows the interpolated data, using the method of the invention. FIG. 11D shows the difference between the original data in FIG. 11A and the interpolated data in FIG. 11C.

FIGS. 12A-12D show a standard ALFT method, as applied to the field data example in FIGS. 11A-11D, for comparison. FIG. 12A shows the original field seismic data, as in FIG. 11A. FIG. 12B shows the input data with traces removed to model aliased data, as in FIG. 11B. FIG. 12C shows the interpolated data, using a standard ALFT method. FIG. 12D shows the difference between the original data in FIG. 12A and the interpolated data in FIG. 12C.

The normalized root mean square (NRMS) difference between the original data in FIG. 11A and the interpolated data in FIG. 11C (the invention) is 70%, while the NRMS difference between the original data in FIG. 12A and the interpolated data in FIG. 12C (standard ALFT) is 84%. Thus, the method of the invention shows better results than standard ALFT for the field data example also.

The anti-alias, anti-leakage Fourier transform method of the invention provides better trace interpolation for aliased seismic data than the standard ALFT alone. The extra cost of computation is estimated to be very limited. The method of the invention, as disclosed here, can easily be extended to multi-dimensional embodiments, including 3D with two spatial dimensions plus time, 4D with three spatial dimensions plus time, and 5D with four spatial dimensions plus time. The spatial dimensions can include a subset of source x, y and receiver x, y coordinates or, equivalently, a subset of inline midpoint, crossline midpoint, offset, and azimuth coordinates. In alternative embodiments, the time coordinate may be a frequency or depth coordinate.

The method of the invention may also be extended to one and multi-dimensional projection-onto-convex-sets (POCS) image restoration algorithms. Other variations are also possible, including smoothing the frequency-wavenumber spectrum to produce better weights and applying other weighting schemes. Other variations include, but are not limited to, using higher frequencies, or information from other gathers, or using a different method to estimate the frequency-wavenumber spectrum at lower frequencies, such as a least squares Fourier transform.

It should be understood that the preceding is merely a detailed description of specific embodiments of this invention and that numerous changes, modifications, and alternatives to the disclosed embodiments can be made in accordance with the disclosure here without departing from the scope of the invention. The preceding description, therefore, is not meant to limit the scope of the invention. Rather, the scope of the invention is to be determined only by the appended claims and their equivalents.

I claim:

1. A method for interpolating traces in seismic data, comprising:

generating an estimated frequency-wavenumber spectrum by applying a first Anti-leakage Fourier transform method to unaliased frequency components of temporal-transformed seismic data and applying a second Anti-leakage Fourier transform method to aliased frequency components of the temporal-transformed seismic data, wherein the second Anti-leakage Fourier transform method applies an absolute frequency-wavenumber spectrum extrapolated from unaliased frequencies to aliased frequencies to weight frequency-wavenumber components of the aliased frequencies; and applying an inverse temporal and spatial Fourier transform to the estimated frequency-wavenumber spectrum thereby generating trace interpolation of the seismic data.

2. The method of claim 1, wherein the first Anti-leakage Fourier transform method is a standard Anti-leakage Fourier transform method.

3. The method of claim 1, wherein the unaliased frequencies are substantially the lower frequencies in the seismic data and the aliased frequencies are substantially the higher frequencies in the seismic data.

4. The method of claim 2, initially comprising:

obtaining input seismic data in the time-space domain;

applying a temporal Fourier transform to the input seismic data, generating transformed seismic data;

determining which frequency components in the transformed seismic data correspond to unaliased frequencies and which frequency components in the transformed seismic data correspond to aliased frequencies; and applying the first Anti-leakage Fourier transform method to each of the unaliased frequency components from the transformed seismic data.

5. The method of claim 4, wherein the temporal Fourier transform is a Fast Fourier Transform.

6. The method of claim 4, further comprising:
determining a number of iterations $N_1$ for the first Anti-leakage Fourier transform method.

7. The method of claim 6, wherein the determining a number of iterations $N_1$ comprises:
determining a threshold $\epsilon_1$ for the first Anti-leakage Fourier transform method.

8. The method of claim 7, further comprising:
initializing an estimated frequency-wavenumber spectrum to zero for the unaliased frequency component;
applying a spatial Fourier transform to the selected unaliased frequency component; and
performing the following for $N_1$ iterations:
selecting a largest wavenumber component in the transformed unaliased frequency component;
adding the largest wavenumber component to the estimated frequency-wavenumber spectrum for the unaliased frequency component;
applying an inverse spatial Fourier transform to the selected largest wavenumber component; and
subtracting the inverse-transformed largest component from the selected unaliased frequency component, generating a corrected frequency component.

9. The method of claim 8, wherein the spatial Fourier transform is a Discrete Fourier Transform.

10. The method of claim 8, wherein the inverse spatial Fourier transform is an inverse Discrete Fourier Transform.

11. The method of claim 8, wherein the spatial Fourier transform is a Nonuniform Fast Fourier Transform.

12. The method of claim 8, wherein the inverse spatial Fourier transform is an inverse Nonuniform Fast Fourier Transform.

13. The method of claim 8, further comprising:
combining the estimated frequency-wavenumber spectra for the unaliased frequency components, generating the unaliased estimated frequency-wavenumber spectrum;
taking an absolute value of the unaliased estimated frequency-wavenumber spectrum, generating an absolute frequency-wavenumber spectrum;
extrapolating the absolute frequency-wavenumber spectrum to unaliased frequencies, generating an extrapolated absolute frequency-wavenumber spectrum; and
applying the second Anti-leakage Fourier transform method to each of the aliased frequency components from the transformed seismic data.

14. The method of claim 13, further comprising:
smoothing the absolute frequency-wavenumber spectrum before extrapolating the absolute frequency-wavenumber spectrum to unaliased frequencies.

15. The method of claim 13, further comprising:
determining a number of iterations $N_2$ for the second Anti-leakage Fourier transform method.

16. The method of claim 15, wherein the determining a number of iterations $N_2$ comprises:
determining a threshold $\epsilon_2$ for the second Anti-leakage Fourier transform method.

17. The method of claim 8, further comprising:
initializing an estimated frequency-wavenumber spectrum to zero for the aliased frequency component;
applying a spatial Fourier transform at the selected aliased frequency component; and
performing the following for $N_2$ iterations:
applying the extrapolated absolute frequency-wavenumber spectrum to the transformed aliased frequency component, generating a weighted aliased frequency-wavenumber spectrum;
selecting the largest wavenumber component in the weighted aliased frequency-wavenumber spectrum;
obtaining the unweighted wavenumber component that corresponds to the largest weighted wavenumber component;
adding the corresponding unweighted wavenumber component to the estimated frequency-wavenumber spectrum for the aliased frequency component;
computing an inverse spatial Fourier transform of the largest unweighted wavenumber component; and
subtracting the computed inverse-transformed largest wavenumber component from the aliased frequency component, generating a corrected aliased frequency component.

18. The method of claim 17, further comprising:
applying an inverse spatial Fourier transform to the selected aliased frequency component, generating interpolated seismic data back in the frequency-space domain.

19. The method of claim 18, wherein the inverse spatial Fourier transform is an inverse Discrete Fourier Transform.

20. The method of claim 19, wherein the inverse spatial Fourier transform is an inverse Nonuniform Fast Fourier Transform.

21. The method of claim 18, further comprising:
applying an inverse temporal Fourier transform to the selected aliased frequency component, generating interpolated seismic data back in the time-space domain.

22. The method of claim 21, wherein the inverse Fourier transform is an inverse Fast Fourier Transform.

* * * * *